United States Patent
Alport et al.

(10) Patent No.: US 8,436,607 B2
(45) Date of Patent: May 7, 2013

(54) MONITORING OF CONVEYOR BELTS

(75) Inventors: Michael John Alport, Durban (ZA); Jacques Frederick Basson, Durban (ZA); Thavashen Padayachee, Durban (ZA)

(73) Assignee: Advanced Imaging Technologies (Proprietary) Limited, Glenwood, Durban (ZA)

( * ) Notice: Subject to any disclaimer, the term of this patent is extended or adjusted under 35 U.S.C. 154(b) by 702 days.

(21) Appl. No.: 12/449,144

(22) PCT Filed: Jan. 24, 2008

(86) PCT No.: PCT/IB2008/050250
§ 371 (c)(1),
(2), (4) Date: Jan. 8, 2010

(87) PCT Pub. No.: WO2008/090521
PCT Pub. Date: Jul. 31, 2008

(65) Prior Publication Data
US 2010/0102810 A1    Apr. 29, 2010

(30) Foreign Application Priority Data

Jan. 26, 2007   (ZA) ................................. 2007/00760

(51) Int. Cl.
*G01N 27/72* (2006.01)
*G01N 27/82* (2006.01)
(52) U.S. Cl.
USPC .......................................... 324/232; 324/238
(58) Field of Classification Search ............ 324/207.24, 324/228, 232, 234, 238
See application file for complete search history.

(56) References Cited

U.S. PATENT DOCUMENTS

| | | | | |
|---|---|---|---|---|
| 2,782,902 | A * | 2/1957 | Sloane | 198/810.01 |
| 2,974,518 | A * | 3/1961 | Jones | 73/1.13 |
| 2,990,898 | A * | 7/1961 | Goslin | 177/16 |
| 4,134,465 | A * | 1/1979 | Takahama et al. | 177/16 |
| 4,439,731 | A | 3/1984 | Harrison | |
| 4,864,233 | A | 9/1989 | Harrison | |
| 5,338,901 | A * | 8/1994 | Dietrich | 177/16 |
| 5,426,362 | A | 6/1995 | Ninnis | |
| 5,453,727 | A * | 9/1995 | Shibasaki et al. | 338/32 R |
| 5,493,216 | A * | 2/1996 | Asa | 324/207.2 |
| 5,570,017 | A * | 10/1996 | Blum | 324/232 |
| 5,843,563 | A | 12/1998 | Tuyuguchi et al. | |
| 7,280,924 | B2 * | 10/2007 | Holmes | 702/32 |
| 7,331,210 | B2 * | 2/2008 | Dietrich | 73/1.13 |
| 2004/0140796 | A1 * | 7/2004 | Okubo et al. | 324/207.25 |
| 2006/0053685 | A1 * | 3/2006 | Holmes | 44/639 |

FOREIGN PATENT DOCUMENTS

| AU | 2006200637 | 9/2006 |
|---|---|---|
| EP | 0 590 734 | 4/1994 |

* cited by examiner

*Primary Examiner* — Bot Ledynh
(74) *Attorney, Agent, or Firm* — Drinker Biddle & Reath LLP

(57) ABSTRACT

A system for monitoring the condition of a conveyor belt having magnetically permeable cords, has a magnetic field generator for generating a magnetic field to magnetize the cords, in use, a magnetic field sensing unit for sensing the magnetic field provided, in use, by the cords, the sensing unit comprising an array of spaced magnetic field sensors, the spacing of the sensors being sufficiently close to discriminate between adjacent cords. The spacing of the sensors depends on the spacing of the cords, and may be less than half the spacing between cords of a conveyor belt. The sensors may be direction sensitive and the sensors may be oriented in more than one direction, to sense the perpendicular and other components of the magnetic field.

41 Claims, 4 Drawing Sheets

MONITORING OF CONVEYOR BELTS

This invention relates to monitoring the condition of conveyor belts. More particularly it relates to a system for and a method of monitoring the condition of conveyor belts having magnetically permeable cords.

It is well known that the complete failure of steel cord-reinforced conveyor belts as used on conveyor belt structures in various mining and industrial applications can have catastrophic results. As such, condition monitoring of these conveyor belts has become common practice, the objective being to identify damage to conveyor belts and thus to effectively maintain conveyor belts, thereby to ensure that the possibility of complete failure is substantially reduced.

A typical steel cord-reinforced conveyor belt as herein envisaged is made up of elongate conveyor belt sections, typically in the order of 300 m in length. Each section comprises a central layer of multi-stranded steel cords sandwiched in a substantially equally-spaced, parallel configuration between two rubber layers, the sections being connected by means of splices. A splice between two sections is formed by overlapping the ends of the two sections by from one to five meters and vulcanizing the sections together. When the sections are so connected, the cords of the sections in the overlapping region are arranged in a pattern in which alternating cords of the sections lie in a parallel adjacent relationship.

A damaged conveyor belt region may constitute a region where one or more individual strands of a cord of a conveyor belt, or a complete cord, are broken, frayed, corroded, or otherwise damaged. It is known to monitor a conveyor belt for such damage by magnetizing the cords of the conveyor belt and sensing for a magnetic field adjacent the conveyor belt, a magnetic field so sensed being indicative of cord damage. Known apparatus for the purpose include coil-type magnetic sensors, one particular known arrangement having four such sensors spaced across the width of the conveyor belt monitored, so that each sensor serves to identify cord damage in a transverse quarter segment of the conveyor belt. Although sufficient to indicate cord damage, the exact transverse location of a damaged cord still remains difficult to establish since these cords are typically joined together in 4 groups across the belt. Also, because a coil-type magnetic sensor in fact senses the rate of change of magnetic field strength within the region where a cord is damaged, it has been found that although a damaged region is adequately indicated, the nature of the damage and the deterioration rate of a damaged cord cannot be established or monitored and, as such, it still remains difficult to establish exactly when conveyor belt maintenance should be optimally performed.

Other condition monitoring apparatus for steel cord-reinforced conveyor belts that utilize generally the above principles also are known, but these are associated with the same inadequacies and it is thus an object of this invention to provide a method of and an apparatus for the above purpose and in respect of which the above inadequacies are at least ameliorated.

According to the invention there is provided a system for monitoring the condition of conveyor belts having magnetically permeable cords, which includes
 a magnetic field generator for generating a magnetic field to magnetize the cords, in use;
 a magnetic field sensing unit for sensing the magnetic field provided, in use, by the cords, the sensing unit comprising an array of spaced magnetic field sensors, the spacing of the sensors being sufficiently close to discriminate between adjacent cords.

Further according to the invention there is provided a method of monitoring the condition of conveyor belts having magnetically permeable cords, which includes
 generating a magnetic field to magnetize the cords; and
 sensing the magnetic field provided by the cords, by means of an array of spaced magnetic field sensors, the spacing of the sensors being sufficiently close to discriminate between adjacent cords.

Still further according to the invention, there is provided a conveyor belt arrangement, which includes
 a belt having a plurality of magnetically permeable cords; and
 a system for monitoring the condition of the belt as described above, the magnetic field generator and the magnetic field sensing unit thereof being positioned adjacent the belt and longitudinally spaced from one another.

The sensors may be spaced less than 20 mm, preferably less than 15 mm, more preferably less than 10 mm and most preferably less than 5 mm. It will be appreciated by those skilled in the art that the spacing of the sensors depends, in use, on the number and spacing of the cords of the belt with which it is intended to be used. Thus, the sensor spacing may be less than half the spacing of the cords of the belt with which it is intended to be, or with which it is, used. In view of the above, each sensor may be smaller than about 4 mm.

It will be appreciated by those skilled in the art that the system may include a belt speed determining means for determining the speed of travel of the belt in a longitudinal direction and hence the longitudinal position of the damages. The belt speed determining means may include an encoder connected to a pulley of the conveyor belt arrangement.

The sensors may have a sensing axis, such that the magnetic field strength in that direction is sensed. The magnetic field sensing unit may have a plurality of perpendicular sensors oriented such that their sensing axes are parallel to each other and oriented to be perpendicular to the belt, in use. In addition, the sensing unit may have a plurality of longitudinal sensors oriented such that their sensing axes are parallel to a direction of travel of the belt. Still further, the sensing unit may have a plurality of transverse sensors oriented such that their sensing axes are transverse to the direction of travel of the belt and substantially parallel to the surface of the belt.

The magnetic field sensing unit may have three arrays of sensors, a first array with the perpendicular sensors, a second array with the longitudinal sensors and a third array with the transverse sensors. These arrays may be longitudinally spaced, with the sensors of each array being longitudinally aligned. Each array may be linear and may be transversely oriented.

Instead, the magnetic field sensing unit may comprise a plurality of groups of sensors, the spacing between the groups being as described above. Each group may then comprise a perpendicular sensor, a longitudinal sensor and a transverse sensor.

The system may include data acquisition equipment for processing the signals received from the sensors and for supplying data to the processor. The data acquisition equipment may have multiple channels or may be of the multiplexed type. If multiplexing is utilised then either analogue or digital multiplexing may be utilized.

It will be appreciated that if groups of sensors are utilized, then the magnetic field sensed by each sensor in a group may be interpolated onto a regular grid to give values of the magnetic field in each direction at the same positions in space.

Similarly if a three array configuration is utilized, then the interpolation may be effected in the longitudinal direction, since the value of each component of the magnetic field above the belt will then be measured at three points in the longitudinal direction separated by a distance equal to the separation between the arrays. Those skilled in the art will appreciate that the speed of travel of the belt will be used to effect the interpolation.

Still further it will be appreciated that it will be possible to determine the vertical position of a cord in the belt matrix using two or three components of the magnetic field since there is a one to one correspondence between the magnetised cords and their surrounding magnetic fields. Thus, the system may incorporate a perpendicular position determining means for determining the vertical position of a cord in the belt matrix. In order to do so, vector values of the magnetic field at each sensing position in a plane parallel, but just above the belt lie in the plane of the sensor array, may be determined and the resulting vectors then utilized to determine the vertical position of the belt This may be effected in a graphical or numerical manner. If a graphical technique is used then the vectors are extrapolated in the region where the perpendicular component is large and their intersection regions determined to obtain a vertical position value. With a numerical technique a model of the magnetic domains in the cords and a non-linear least squares fit may be used to determine the vertical position value.

The processor may generate an image representative of the condition of the belt and/or a portion thereof. This image may indicate the longitudinal and transverse position of damaged areas, the size thereof and the severity of damage. Colour coding may be used to indicate the severity of damage. The position of splices may also be indicated. The system may then have a display unit for displaying the or each image.

The invention will now be described by way of non-limiting examples, with reference to the accompanying schematic drawings, in which FIG. 1 shows schematically a conveyor belt arrangement in accordance with the invention;

Figure 1:
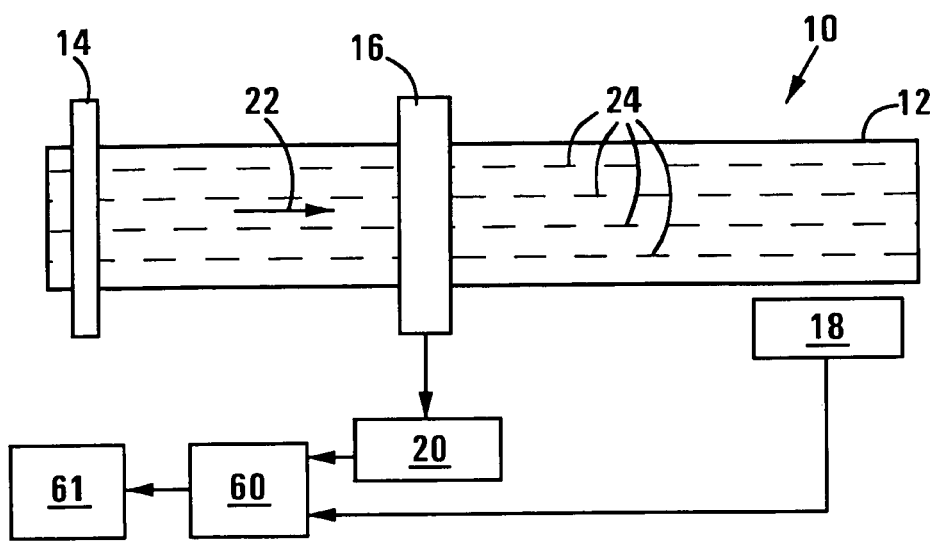

Referring to FIG. 1, a conveyor belt arrangement in accordance with the invention is designated generally by reference numeral 10. The arrangement 10 has a conveyor belt 12, a magnetic field generator 14, a magnetic field sensing unit 16, an encoder 18 for determining the speed of travel of the belt 12 and data acquisition equipment 20 for processing signals received from the field sensing unit 16 and for supplying data to a processor 60. The processor 60 supplies images to a display unit 61 to be displayed thereby. The direction of travel of the belt 12 is indicated by arrow 22. The field generator 14 and the field sensing unit 16 extend across the belt 12 and are mounted about 4 cm to 5 cm above the belt 12. The encoder 18 is connected to a pulley of the arrangement 10, to monitor the speed of travel of the belt 12.

It will be appreciated that the direction of travel 22 defines a longitudinal direction, with a transverse direction being defined across the belt 12 and a perpendicular direction being defined perpendicular to the belt 12.

The belt 12 transports bulk material such as coal, iron ore and the like. It is constructed of a rubber matrix in which is imbedded a number of cords 24 that are comprised of braided strands of steel wire that run along the length of the belt 12. These cores are thus magnetically permeable. Typical belts have cord spacing of 10 mm to 25 mm. Clearly, the number of cords 24 in a belt 12 will depend on the spacing of he cords 24 and the width of the belt 12. Although only four cords 24 are shown in FIG. 1 it will be appreciated that in practice a larger number of cords 24 will typically be used.

In use, as is known in the art, a magnetic field is generated by the field generator 14 which magnetises the cords 24. If there is a break in a cord 24 then fringing (or leakage) magnetic fields result around these breaks that are sensed by sensors of the field sensing unit 16. The spacing of the sensors is sufficiently close to discriminate between adjacent cords, as will be described more fully below. Signals provided by the field sensing unit 16 are processed by the data acquisition equipment 20 and data supplied thereby is processed by the processor 60 to indicate that there is a break and the position thereof, as is also explained in more detail below.

Figure 2:
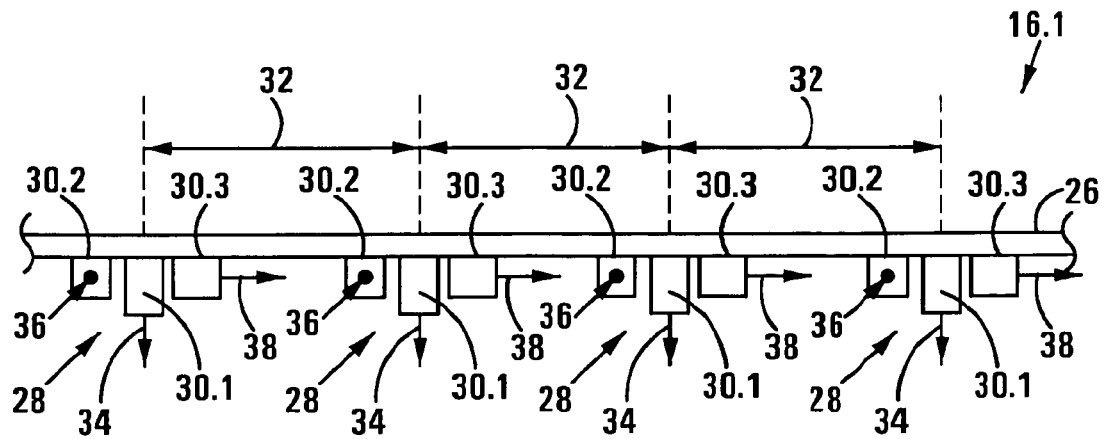
FIG. 2 shows schematically a first embodiment of a field sensing unit in accordance with the invention.

Referring now to FIG. 2, a first embodiment of a field sensing unit 16.1 is shown. This field sensing unit 16.1 has an elongate carrier 26 on which are mounted a number of groups 28 of sensors 30. The sensors 30 each have a sensing axis. Each group 28 has a perpendicular sensor 30.1, a longitudinal sensor 30.2 and a transverse sensor 30.3. The perpendicular sensor 30.1 of each group has its associated longitudinal sensor 30.2 on its left side and its associated transverse sensor 30.3 on its right side. The groups 28 are spaced apart a distance indicated by arrows 32. The perpendicular sensors 30.1 have a sensing axis 34, the longitudinal sensors 30.2 have a sensing axis 36, and the transverse sensors 30.3 have a sensing axis 38. It will thus be appreciated that when the carrier is placed in position across and above the belt 12, the perpendicular sensors 30.1 will point down, the longitudinal sensors 30.2 will point in the direction of travel 22 and the transverse sensors 30.2 will point across the belt 12. Thus, the perpendicular sensors 30.1 will measure the vertical component of the magnetic field, the longitudinal sensors 30.2 will measure the longitudinal component of the magnetic field and the transverse sensors 303 will measure the transverse component of the magnetic field at each position across the belt 12 as the belt travels below it. As indicated above the signals from the longitudinal sensors 30.2 and the transverse sensors 30.3 are interpolated to provide representative signals at the centre of their associated perpendicular sensors 30.1. The carrier 26 and the sensors 30.1, 30.2 and 30.3 provides a single array 40.

Figure 3:
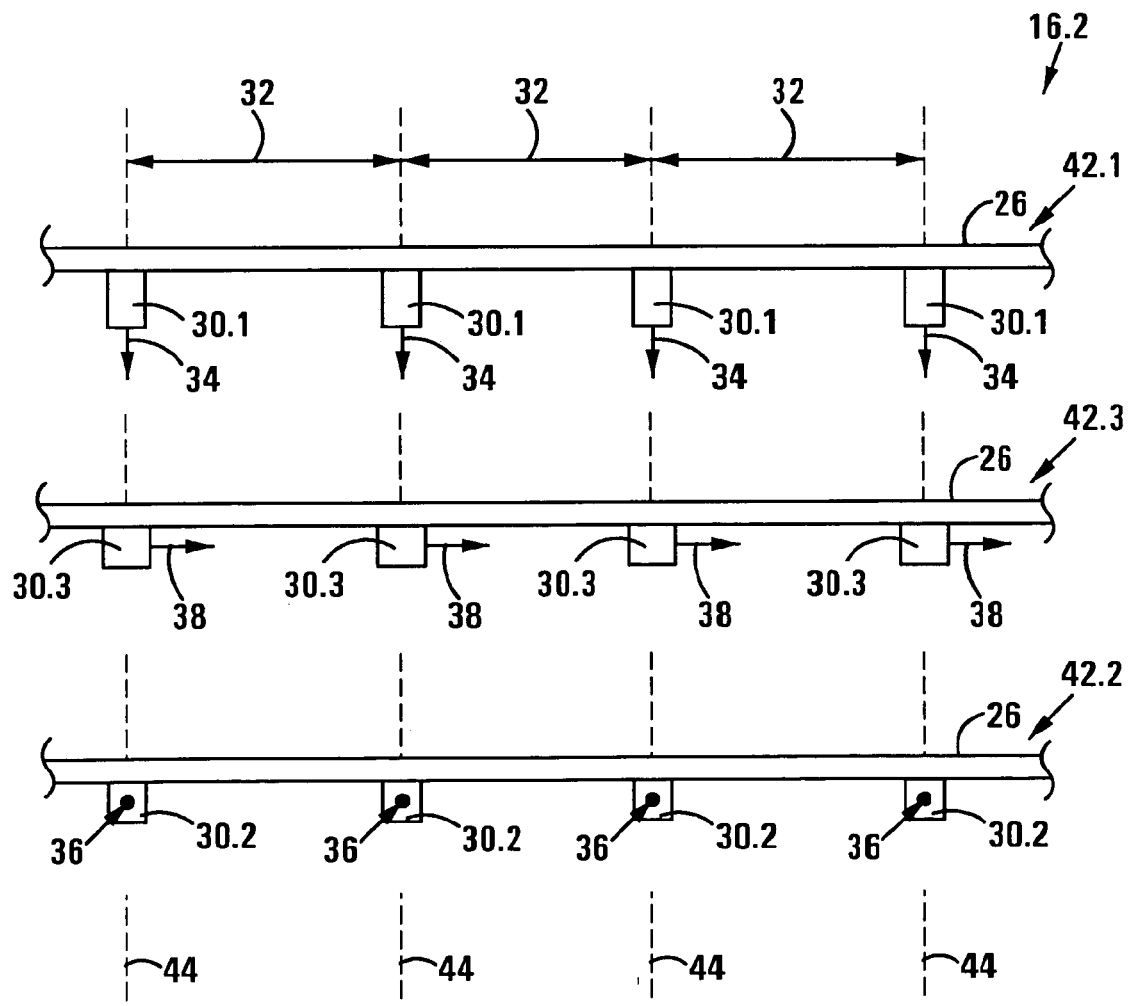
FIG. 3 shows schematically a second embodiment of a field sensing unit in accordance with the invention.

Referring now to FIG. 3 a second embodiment of a field sensing unit 16.2 is shown. This field sensing unit 16.2 is numbered in a similar manner to the field sensing unit 16.1 of FIG. 2. The field sensing unit 16.2 has three arrays 42.1, 42.2 and 42.3. Each array 42.1, 42.2 42.3 comprises a carrier 26 with sensors 30 mounted thereon. However, the array 42.1 has only perpendicular sensors 30.1, the array 42.2 has only longitudinal sensors 30.2, and the array 42.3 has only transverse sensors 30.3. The sensors 30 of each array are longitudinally aligned, as indicated by lines 44. The sensors 30 are also spaced a distance indicated by the arrows 32. With this embodiment the magnetic field components are sensed at different positions along the length of the belt 12 and the signals from the longitudinal sensors 30.2 and transverse sensors 30.3 are interpolated to the position of their associated perpendicular sensors 30.1, using the speed of travel of the belt 12 as provided by the encoder 18.

The groups of sensors 28 of the field sensing unit 16.1 and the sensors 30 of the field sensing unit 16.2 are spaced apart less than 25 mm. With belts having a cord spacing of 10 mm to 25 mm the spacing of the sensors 30 of the field sensing unit 16.2 will be between 5 mm and 12.5 mm. In the most sophisticated embodiment they are spaced about 4 mm apart.

It will be appreciated that in many applications it will be sufficient to determine only the perpendicular magnetic component and the arrangement 10 could use only the array 42.1.

The sensors 30 are Hall effect sensors and are supplied by Allegro Microsystems, with part number A1302KLHLt-T.

Figure 4:
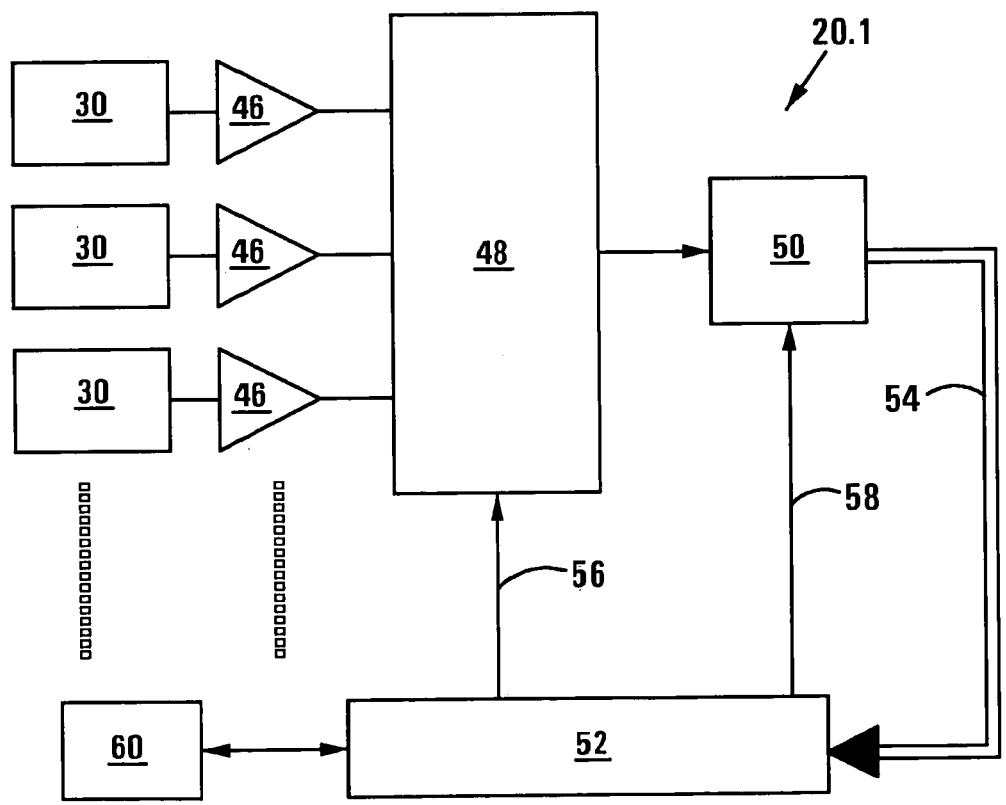
FIG. 4 shows schematically a first embodiment of data acquisition equipment in accordance with the invention.

Referring now to FIG. 4 a first embodiment of data acquisition equipment 20.1 for processing the signals received from the sensors 30 is shown. The equipment 20.1 has a buffer 46 for each sensor 30 which supplies an analog multiplexer 48 with buffered signals. The output of the multiplexer 48 is supplied to an A/D converter 50, the digital output of which is supplied to a field programmable gate array (FPGA) 52 via a data bus 54. The FPGA 52 is connected to the multiplexer 48 and the converter 50 by command links 56 and 58. The FPGA 52, in turn, supplies data signals to a processor 60.

The analog voltages from each of the sensors 30 are first amplified and filtered by the buffers 46. The filtered analog values are fed into the n-channel multiplexer 48. n is the number of sensors 30. The command outputs from the FPGA 52 determines which analog input value is switched through to the output of the multiplexer 48. Typically devices with only a maximum of 16 channel multiplexers are available. However, the number of channel inputs can be increased by connecting a number of slave multiplexers to one master multiplexer. For example, the outputs of sixteen 16-channel slave multiplexers can be connected to the inputs of a single master multiplexer. This particular configuration will result in the equivalent of a single 16×16=256 channel multiplexer. The analog voltage outputs from, typically 256, channels are converted to their digital values by the single A/D converter 50. The A/D converter 50 must be capable of sampling at a rate equal to $n.f_{samp}$ where n is the number of analog channels and $f_{samp}$ is the sampling frequency of each channel. The FPGA 52 directs the required convert signal to the A/D converter 50, and controls the A/D converter, thus determining the sampling rate. The digital outputs from he A/D converter 50 are received by the FPGA 52 and sent to the processor 60 via a suitable (e.g. ISA) bus.

Figure 5:
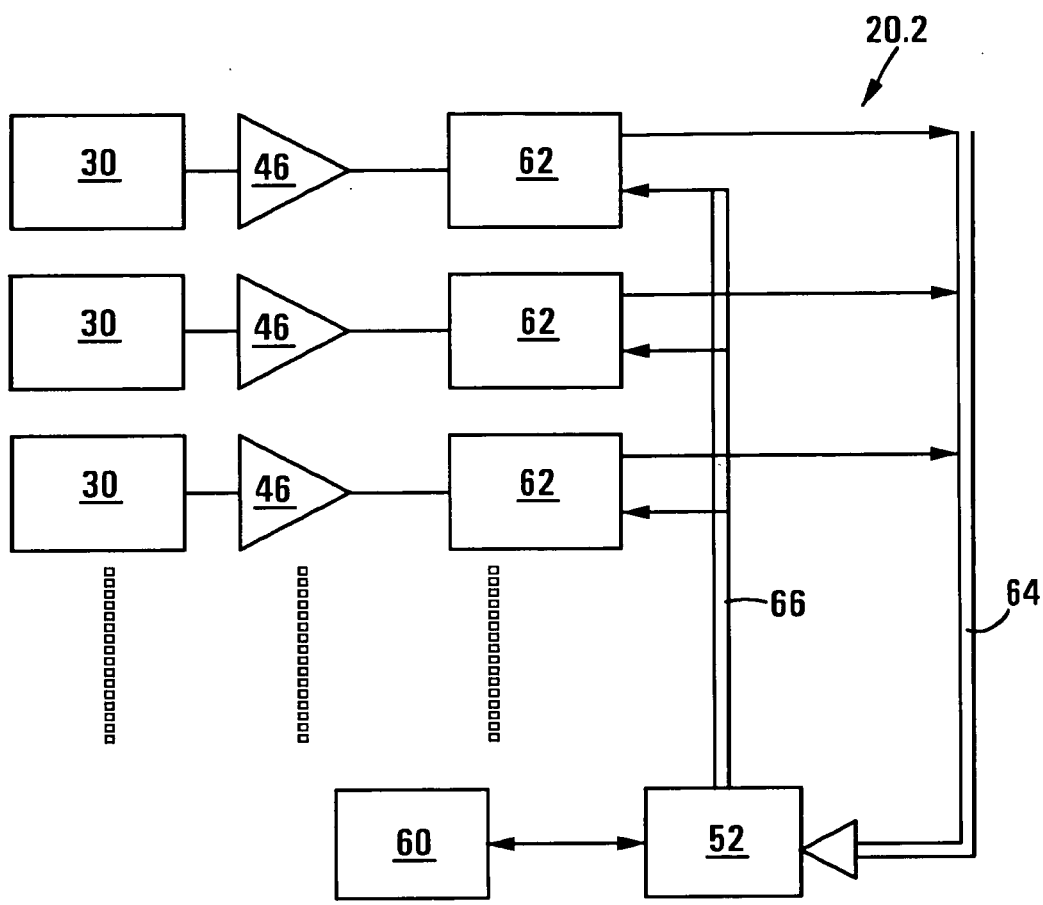
FIG. 5 shows schematically a second embodiment of data acquisition equipment in accordance with the invention.

Referring now to FIG. 5, a second embodiment 20.2 of data acquisition equipment is shown. With this embodiment 20.2, the buffers 46 are each connected to an A/D converter 62. The outputs of the converters 62 are supplied to the FPGA 52 via a data bus 64, the converters 62 being controlled via a command bus 66.

The voltage from each sensor 30 is level shifted, filtered and amplified by its buffer 46. Each channel's analog output is then digitized by a separate converter 62. The FPGA 52 performs two functions. Firstly, it sends out commands on the command bus 66 to initiate the A/D conversions by the converters 62. Secondly it reads the outputs from the individual converters 62 sequentially and transfers these values to the processor 60 using e.g. an bus.

The rate at which the outputs from the sensor array is sampled is determined by the longitudinal scale size of the magnetic structures. The scale size of the magnetic structures of the fringing field is in turn determined by the distance between the north and south poles of the cord break and the vertical height of the sensors above the cords. The magnetic structures smooth out as the cord-sensor distance is increased. Typically, for sensor-cord distances of ~4 cm, a sampling rate of 200 Hz is found to be adequate. This give a Nyquist frequency of 100 Hz and a longitudinal spatial scale size of $x=v/f_{samp}=5/100=0.01$ m=10 mm for a typical belt speed of 5 m/s. Using these values, there needs to be an anti-aliasing filter with a cut-off frequency of 100 Hz. Since this is in excess of the mains (50/60 Hz) frequency it may be necessary to sample the sensor synchronously with the mains phase in order to minimize mains induced interference.

Figure 6:
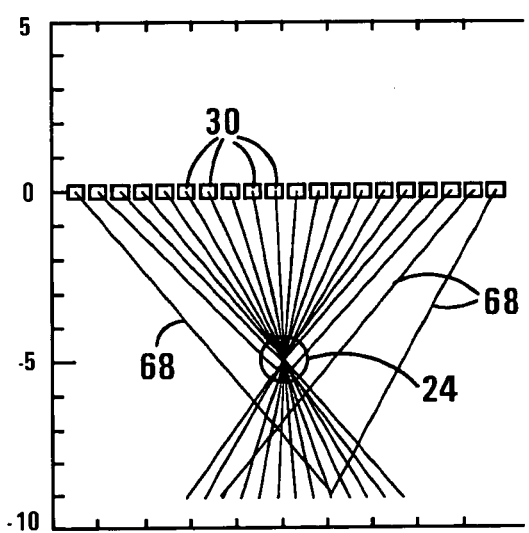
FIG. 6 shows schematically how the vertical position of a cord in the matrix of the conveyor belt is determined graphically.

With reference to FIG. 6, there is a graphical indication of the manner in which the position of a cord break in the belt matrix may be determined. Using only the perpendicular components of the magnetic field from the sensors is adequate to identify the transverse and longitudinal position of a cord break, but this does not give its vertical position in the belt matrix. In order to do this at least one other magnetic field component needs to be measured. For example if the transverse and perpendicular components are plotted in a plane perpendicular to the cords, then the vectors, when extrapolated in both directions, in the region of the poles, will be directed to the cords, and in fact will intersect the center of the cords. An example of this result is shown in FIG. 6 where the vector magnetic field, measured by each sensor at z=0, when extrapolated, meet at the center of the cords located at z=−5. This technique works since there is a one to one correspondence between the magnetized cords and the resulting fringing fields. Care should be taken to only extrapolate those vectors that have a significant perpendicular component. For example, those lines which originate between the cords and marked 68 do not intersect at the cords.

Figure 7:
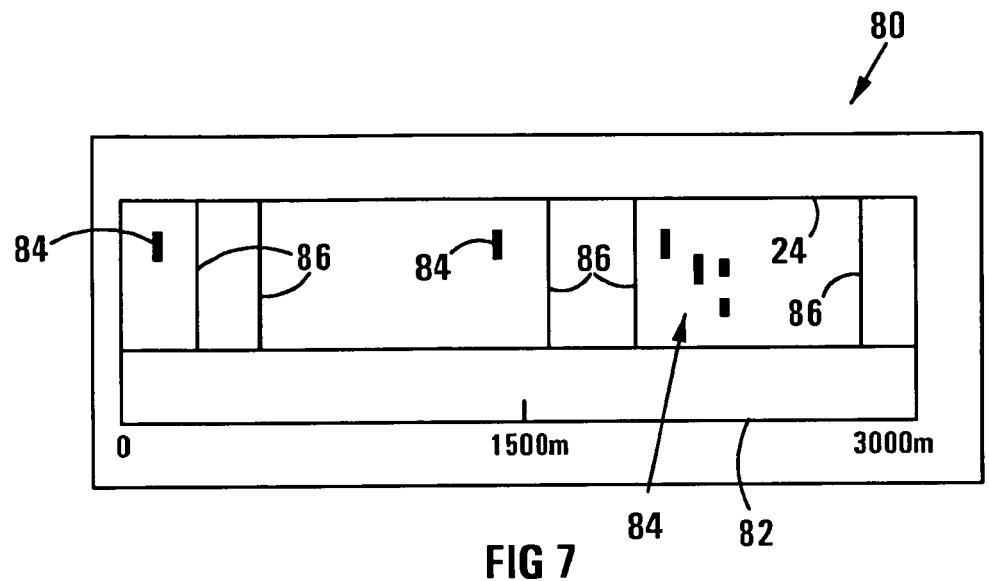
FIG. 7 shows schematically a first image generated by the system.
Figure 8:
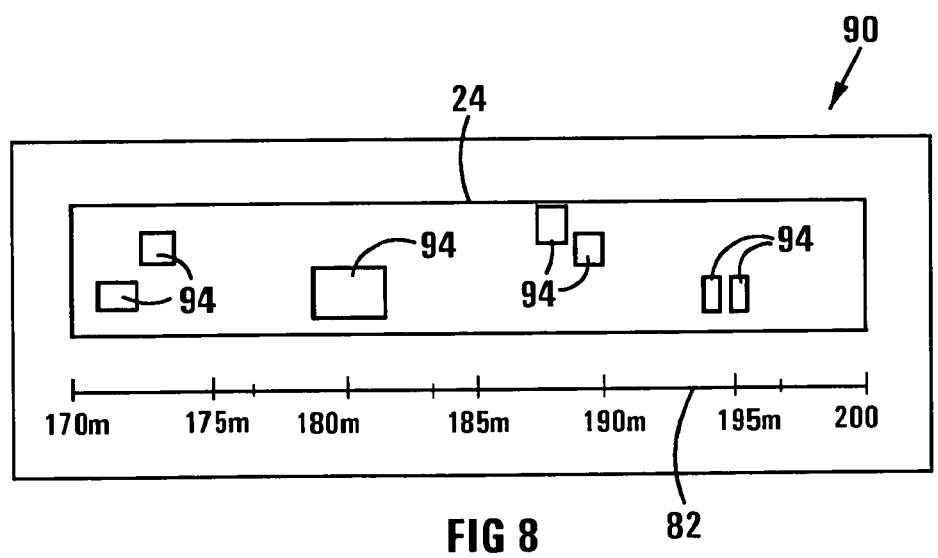
FIG. 8 shows schematically a second image generated by the system.

It will be appreciated by those skilled in the art that the processor 60 generates an image which represents the condition of the belt 24 and also of a selected portion of the belt 24. These images are displayed on the display unit 61. A first image 80, that of the entire belt 24, is shown in FIG. 7. Thus, the image 80 has a ruler 82 and a representation of the belt 24, with damaged areas 84 and splices 86 indicated thereon. The longitudinal and transverse positions of the damaged areas are indicated graphically. Further, the processor 60 is able to determine the severity of damage by means of the magnitude of the fringing magnetic fields, and the severity of the damage at each area is indicated in a colour coded manner. A second image 90, which is for the selected portion, is shown in FIG. 8. This image 90 also has a ruler 82 and a representation of the portion of the belt 24, with the damaged areas 94 indicated thereon, and showing in more detail the longitudinal extent of the damage. The severity of the damage is again indicated in a colour coded manner.

The invention claimed is:

1. A system for monitoring the condition of a conveyor belt having magnetically permeable cords, which includes
   a magnetic field generator for generating a magnetic field to magnetize the cords, in use; and
   a magnetic field sensing unit for sensing the magnetic field provided, in use, by the cords, the sensing unit comprising an array of spaced magnetic field sensors each having a sensing axis, with the spacing of the sensors being sufficiently close to discriminate between adjacent cords and with a plurality of perpendicular sensors being oriented such that their sensing axes are parallel to each other and perpendicular to the belt, in use.

2. A system as claimed in claim 1, in which the sensors are spaced less than 20 mm apart.

3. A system as claimed in claim 2, in which the sensors are spaced less than 15 mm apart.

4. A system as claimed in claim 3, in which the sensors are spaced less than 10 mm apart.

5. A system as claimed in claim 4, in which the sensors are spaced less than 5 mm apart.

6. A system as claimed in claim 1, in which the spacing of the sensors is less than half the spacing between cords of a conveyor belt with which the system is intended to be used.

7. A system as claimed in claim 1 in which the sensors are smaller than 4 mm.

8. A system as claimed in claim 1, which includes a belt speed determining means for determining the speed of travel of the belt in a longitudinal direction.

9. A system as claimed in claim 8, in which the belt speed determining means includes an encoder connectable to a pulley of a conveyor belt arrangement.

10. A system as claimed in claim 1, in which the sensing unit has a plurality of longitudinal sensors oriented such that their sensing axes are parallel to a direction of travel of the belt, in use.

11. A system as claimed in claim 1, in which the sensing unit has a plurality of transverse sensors oriented such that their sensing axes are transverse to the direction of travel of the belt and substantially parallel to the surface of the belt, in use.

12. A system as claimed in claim 10, in which the magnetic field sensing unit has a plurality of sensor arrays, with the sensors of each array being similarly oriented and with the arrays being longitudinally spaced, with the sensors of each array being longitudinally aligned.

13. A system as claimed in claim 12, in which each array is linear.

14. A system as claimed in claim 10, in which the magnetic field sensing unit comprises a single array having a plurality of groups of sensors, each group comprising a perpendicularly oriented sensor and a longitudinally oriented sensor.

15. A system as claimed in claim 11, in which the magnetic field sensing unit comprises a single array having a plurality of groups of sensors, each group comprising a perpendicularly oriented sensor and a transversely oriented sensor.

16. A system as claimed in claim 1, which includes data acquisition equipment for processing signals received from the sensors and for providing data to the processor.

17. A system as claimed in claim 16, in which the data acquisition equipment has multiple channels, there being a channel for each sensor.

18. A system as claimed in claim 16, in which the data acquisition equipment includes a multiplexer.

19. A system as claimed in claim 11, which includes a perpendicular position determining means for determining the vertical position of a cord in the belt matrix.

20. A system as claimed in claim 1, in which the processor generates an image representative of the condition of at least a portion of the belt and the system includes a display unit for displaying the image.

21. A method of monitoring the condition of a conveyor belt having magnetically permeable cords, which includes
generating a magnetic field to magnetize the cords; and
sensing the magnetic field provided by the cords, by means of an array of spaced magnetic field sensors each having a sensing axis, the spacing of the sensors being sufficiently close to discriminate between adjacent cords and a plurality of the sensors being oriented such that their sensing axes are parallel to each other and perpendicular to the belt.

22. A method as claimed in claim 21, in which the sensors are spaced less than 20 mm apart.

23. A method as claimed in claim 22, in which the sensors are spaced less than 15 mm apart.

24. A method as claimed in claim 23, in which the sensors are spaced less than 10 mm apart.

25. A method as claimed in claim 21, in which the sensors are spaced less than 5 mm apart.

26. A method as claimed in claim 22, in which the spacing of the sensors is less than half the spacing between cords of a conveyor belt with which the system is used.

27. A method as claimed in claim 20, in which the sensors are smaller than 4 mm.

28. A method as claimed in claim 21, which includes determining the speed of travel of the belt in a longitudinal direction.

29. A method as claimed in claim 28, in which the belt speed is determined by means of an encoder connectable to a pulley of a conveyor belt arrangement.

30. A method as claimed in claim 21, in which a plurality of the sensors are longitudinally oriented such that their sensing axes are parallel to the direction of travel of the belt.

31. A method as claimed in claim 21, in which a plurality of the sensors are transversely oriented such that their sensing axes are transverse to the direction of travel of the belt and substantially parallel to the surface of the belt.

32. A method as claimed in claim 30, in which the sensors are arranged in a plurality of sensor arrays, with the sensors of each array being similarly oriented and with the arrays being longitudinally spaced, with the sensors of each array being longitudinally aligned.

33. A method as claimed in claim 32, in which each array is linear.

34. A method as claimed in claim 30, in which the sensors are arranged in a single array having a plurality of groups of sensors, each group comprising a perpendicularly oriented sensor and a longitudinally oriented sensor.

35. A method as claimed in claim 31, in which a single array is used, which has a plurality of groups of sensors, each group comprising a perpendicularly oriented sensor and a transversely oriented sensor.

36. A method as claimed in claim 21, which includes processing signals received from the sensors.

37. A method as claimed in claim 36, in which the signals are processed in multiple channels, there being a channel for each sensor.

38. A method as claimed in claim 36, in which signals are processed in a multiplexed manner.

39. A method as claimed in claim 31, which includes determining the vertical position of a cord in the belt matrix.

40. A method as claimed in claim 20, which includes generating an image representative of the condition of at least a portion of the belt and displaying the image.

41. A conveyor belt arrangement, which includes
a belt having a plurality of magnetically permeable cords; and
a system for monitoring the condition of the belt as claimed in claim 1, the magnetic field generator and the magnetic field sensing unit thereof being positioned adjacent the belt and longitudinally spaced from one another.

* * * * *